US010469856B2

(12) United States Patent
Kim et al.

(10) Patent No.: US 10,469,856 B2
(45) Date of Patent: Nov. 5, 2019

(54) APPARATUS AND METHOD FOR TRANSMITTING AND RECEIVING 3DTV BROADCASTING

(71) Applicants: ELECTRONICS AND TELECOMMUNICATIONS RESEARCH INSTITUTE, Daejeon (KR); KOOKMIN UNIVERSITY INDUSTRY ACADEMY COOPERATION FOUNDATION, Seoul (KR)

(72) Inventors: Sung-Hoon Kim, Daejeon (KR); Jooyoung Lee, Daejeon (KR); Se Yoon Jeong, Daejeon (KR); Hui Yong Kim, Daejeon (KR); Jin Soo Choi, Daejeon (KR); Dong Wook Kang, Seoul (KR); Jinsuk Kwak, Daejeon (KR); Minsuk Lee, Daejeon (KR); Kyeong Hoon Jung, Seoul (KR); Suk Jin Hong, Seoul (KR)

(73) Assignees: ELECTRONICS AND TELELCOMMUNICATIONS RESEARCH INSTITUTE, Daejeon (KR); KOOKMIN UNIVERSITY INDUSTRY ACADEMY COOPERATION FOUNDATION, Seoul (KR)

(*) Notice: Subject to any disclaimer, the term of this patent is extended or adjusted under 35 U.S.C. 154(b) by 153 days.

(21) Appl. No.: 14/952,823

(22) Filed: Nov. 25, 2015

(65) Prior Publication Data
US 2016/0150237 A1 May 26, 2016

(30) Foreign Application Priority Data
Nov. 25, 2014 (KR) .................. 10-2014-0165653
Nov. 24, 2015 (KR) .................. 10-2015-0164947

(51) Int. Cl.
H04N 19/30 (2014.01)
H04N 13/00 (2018.01)
(Continued)

(52) U.S. Cl.
CPC ........... *H04N 19/30* (2014.11); *H04N 13/161* (2018.05); *H04N 13/194* (2018.05); *H04N 19/187* (2014.11); *H04N 19/597* (2014.11)

(58) Field of Classification Search
CPC .. H04N 19/30; H04N 19/187; H04N 13/0048; H04N 19/597
(Continued)

(56) References Cited

U.S. PATENT DOCUMENTS

2008/0211901 A1* 9/2008 Civanlar ................ H04N 7/152
348/14.09
2008/0239062 A1* 10/2008 Civanlar ................ H04N 7/152
348/14.09
(Continued)

FOREIGN PATENT DOCUMENTS

WO WO 2012/064123 A2 5/2012

*Primary Examiner* — Hee-Yong Kim

(57) ABSTRACT

An apparatus for transmitting 3DTV broadcasting encodes a base video using scalable video coding (SVC) or scalable high efficiency video coding (SHVC) scheme to generate a base layer stream and an enhancement layer stream of the base video, encodes each of an additional video and video enhancement information data for enhancing video quality of the additional video, transmits the base layer stream and the enhancement layer stream of the base video through a base layer channel and an enhancement layer channel, respectively, and transmits the encoded additional video and the encoded video enhancement information data through the base layer channel or the enhancement layer channel.

7 Claims, 6 Drawing Sheets

(51) Int. Cl.
  *H04N 19/187*    (2014.01)
  *H04N 13/161*    (2018.01)
  *H04N 19/597*    (2014.01)
  *H04N 13/194*    (2018.01)

(58) Field of Classification Search
  USPC .................................................. 375/240.02
  See application file for complete search history.

(56) References Cited

U.S. PATENT DOCUMENTS

| | | | |
|---|---|---|---|
| 2010/0141738 A1 | 6/2010 | Lee et al. | |
| 2010/0266052 A1* | 10/2010 | Kim ....................... | H04H 20/18 375/240.28 |
| 2012/0075436 A1* | 3/2012 | Chen ................... | H04N 13/0048 348/51 |
| 2012/0320168 A1 | 12/2012 | Yun et al. | |
| 2013/0235159 A1 | 9/2013 | Kim et al. | |
| 2013/0250051 A1 | 9/2013 | Lee et al. | |
| 2014/0245371 A1* | 8/2014 | Lee ........................ | H04N 21/84 725/116 |
| 2014/0307049 A1* | 10/2014 | Kim ..................... | H04N 13/139 348/43 |

* cited by examiner

APPARATUS AND METHOD FOR TRANSMITTING AND RECEIVING 3DTV BROADCASTING

CROSS-REFERENCE TO RELATED APPLICATION

This application claims priority to and the benefit of Korean Patent Application Nos. 10-2014-0165653, and 10-2015-0164947 filed in the Korean Intellectual Property Office on Nov. 25, 2014, and Nov. 24, 2015, the entire contents of which are incorporated herein by reference.

BACKGROUND OF THE INVENTION (a) Field of the Invention

The present invention relates to an apparatus for transmitting and receiving 3DTV broadcasting. More particularly, the present invention relates to an apparatus for transmitting and receiving 3DTV broadcasting capable of providing a high video quality 3D video in a situation in which fixed broadcasting and mobile broadcasting are broadcast using a scalable video coder rather using independent video encoders for a base video (for example, a left video) and an additional video (for example, a right video).

(b) Description of the Related Art

In the case of an existing fixed and mobile broadcasting convergent 3DTV service, a transmitting end (Tx) transmits a base video through a fixed TV channel and transmits an additional video through a mobile TV channel using independent video encoders for the base video and the additional video in order to transmit binocular base and additional videos. In addition, in the case in which a resolution difference between the base video and the additional video is large, the transmitting end additionally transmits data called video enhancement information (VEI) through the fixed TV channel in order to enhance video quality of the additional video. In this case, a receiving end (Rx) receives the VEI and performs VEI related post-processing to enhance the video quality of the additional video.

However, the existing convergent 3DTV scheme is necessarily premised on a simulcast scheme in which the base video and the additional video are simultaneously broadcast to the fixed TV channel and the mobile TV channel, respectively, using the independent video encoders per channel.

When a broadcasting station allows a base layer to air at a HDTV resolution service for a mobile TV broadcasting environment in which a transmission channel environment is poor and allows an enhancement layer to be additionally received in a fixed TV broadcasting environment in which a reception environment is better to provide a UHDTV 2DTV service by applying a scalable video coder based on unequal error protection (UEP) transmission in order to efficiently utilize frequencies, only information of the base video in both of the base layer and the enhancement layer is transmitted.

Therefore, in a broadcasting service environment using SVC scheme, using only the base video based on the UEP transmission, it is impossible to provide a 3D service in the existing convergent 3DTV scheme in which the additional video should be simultaneously transmitted through the mobile TV channel in order to synthesize a 3D video.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and a method for transmitting and receiving 3DTV broadcasting having advantages of providing a high video quality 3D video in a situation that is not a simulcast broadcasting environment in which a base video and an additional video are simultaneously broadcast through a fixed TV channel and a mobile TV channel, respectively, in other words, in a situation in which fixed broadcasting and mobile broadcasting are broadcast using a scalable video coder rather than using independent video encoders for the base video and the additional video.

An exemplary embodiment of the present invention provides a method for transmitting 3DTV broadcasting by an apparatus for transmitting 3DTV broadcasting. The method for transmitting 3DTV broadcasting includes: encoding a base video using scalable video coding (SVC) or scalable high efficiency video coding (SHVC) scheme to generate a base layer stream and an enhancement layer stream of the base video; encoding an additional video; encoding video enhancement information data for enhancing video quality of the additional video; transmitting the base layer stream and the enhancement layer stream of the base video through a base layer channel and an enhancement layer channel, respectively; and transmitting the encoded additional video and the encoded video enhancement information data through the base layer channel or the enhancement layer channel.

A resolution of the additional video may be lower than that of the base video.

The transmitting of the encoded additional video and the encoded video enhancement information data may include: transmitting the encoded additional video and the encoded video enhancement information data through the base layer channel in the case of mobile broadcasting; and transmitting the encoded additional video and the encoded video enhancement information data through the enhancement layer channel in the case of fixed broadcasting.

The encoding of the base video may include: compressing videos corresponding to a resolution lower than that of the base video to generate the base layer stream; and compressing differential videos corresponding to different information between a video decodable from the base layer stream and an original base video to generate the enhancement layer stream.

The encoding of the video enhancement information data may include comparing the base video and the additional video with each other to generate the video enhancement information data.

Another exemplary embodiment of the present invention provides a method for receiving 3DTV broadcasting by an apparatus for receiving 3DTV broadcasting. The method for receiving 3DTV broadcasting includes: receiving a base layer stream and an enhancement layer stream of an encoded base video using scalable video coding (SVC) or scalable high efficiency video coding (SHVC) scheme through a base layer channel and an enhancement layer channel, respectively; receiving video enhancement information data for enhancing video quality of an additional video and data of the additional video through the base layer channel or the enhancement layer channel; enhancing the video quality of the additional video using the video enhancement information data; and reproducing a three-dimensional (3D) video using the base video and the additional video of which the video quality is improved.

The receiving of the video enhancement information data for enhancing the video quality of the additional video and the data of the additional video may include receiving the video enhancement information data and the data of the additional video through the base layer channel in the case of mobile broadcasting, and the reproducing of the 3D video may include obtaining the base video by decoding the base layer stream in the case of the mobile broadcasting.

The receiving of the video enhancement information data for enhancing the video quality of the additional video and the data of the additional video may include receiving the video enhancement information data and the data of the additional video through the enhancement layer channel in the case of fixed broadcasting, and the reproducing of the 3D video may include obtaining the base video by decoding each of the base layer stream and the enhancement layer stream in the case of the fixed broadcasting.

A resolution of the additional video may be lower than that of the base video.

The enhancing of the video quality of the additional video may include: converting a resolution of the additional video so as to be the same as that of the base video; and enhancing the video quality of the additional video using the video enhancement information data, and the video enhancement information data may be generated on the basis of a comparison result between the base video and the additional video.

Yet another exemplary embodiment of the present invention provides an apparatus for transmitting 3DTV broadcasting. The apparatus for transmitting 3DTV broadcasting includes: a base video scalable video encoder, an additional video encoder, a video enhancement information encoder, a channel selector, and a transmitter. The base video scalable video encoder encodes a base video using scalable video coding (SVC) or scalable high efficiency video coding (SHVC) scheme to generate a base layer stream and an enhancement layer stream of the base video. The additional video encoder encodes an additional video having a resolution lower than that of the base video. The video enhancement information encoder encodes video enhancement information data for enhancing video quality of the additional video. The channel selector selects a base layer channel and an enhancement layer channel as transmission channels of the base layer stream and the enhancement layer stream of the base video, respectively, and selects the base layer channel or the enhancement layer channel as a transmission channel of the encoded additional video and the encoded video enhancement information data. The transmitter transmits each of the base layer stream and the enhancement layer stream of the base video, the encoded additional video, and the encoded video enhancement information data through the selected transmission channel.

The apparatus for transmitting 3DTV may further include a video enhancement information generator generating the video enhancement information data on the basis of a comparison result between the base video and the additional video.

The channel selectors may select the base layer channel as a transmission channel of the encoded additional video and the encoded video enhancement information data in the case of mobile broadcasting, and select the enhancement layer channel as a transmission channel of the encoded additional video and the encoded video enhancement information data in the case of fixed broadcasting.

Yet still another exemplary embodiment of the present invention provides an apparatus for receiving 3DTV broadcasting. The apparatus for receiving 3DTV broadcasting includes: a base video scalable video decoder, first and second decoders, a video selector, a video enhancer, and a reproducer. The base video scalable video decoder decodes a base layer stream and an enhancement layer stream of a base video received through a base layer channel and an enhancement layer channel, respectively, in scalable video decoding scheme, to obtain a first video and a second video. The first and second decoders decode video enhancement information data for enhancing video quality of an additional video having a resolution lower than that of the base video and data of the additional video that are received through the base layer channel or the enhancement layer channel, respectively. The video selector selects one of the first video and the second video as the base video. The video enhancer enhances the video quality of the additional video using the video enhancement information data. The reproducer reproduces a 3D video using the base video and the additional video of which the video quality is improved.

The video enhancement information data and the data of the additional video may be transmitted through the base layer channel in the case of mobile broadcasting, and the video enhancement information data and the data of the additional video may be transmitted through the enhancement layer channel in the case of fixed broadcasting.

The video selector may select the first video as the base video in the case of the mobile broadcasting, and select the second video as the base video in the case of the fixed broadcasting.

The video enhancer may convert the resolution of the additional video so as to be the same as that of the base video, and enhance the video quality of the additional video using the video enhancement information data.

DETAILED DESCRIPTION OF THE EMBODIMENTS

Figure 1:
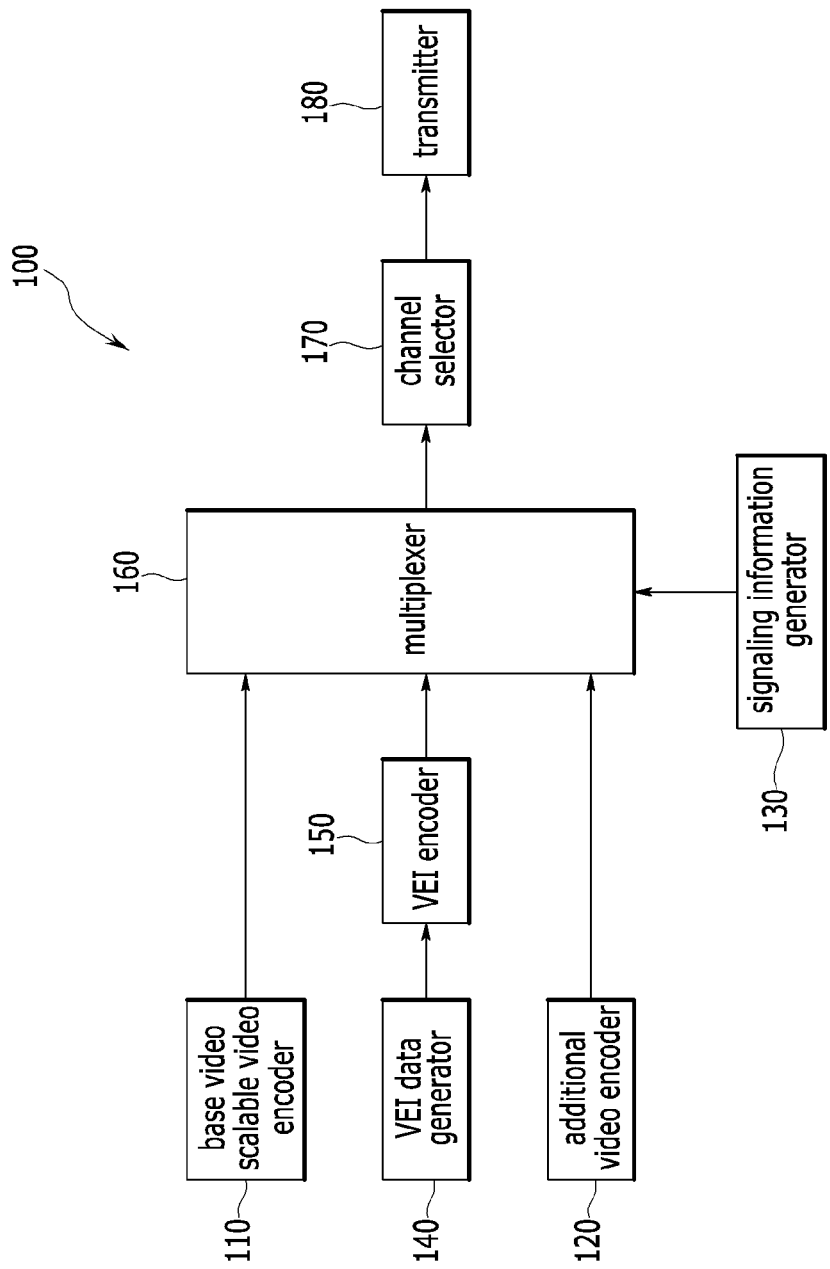
FIG. 1 is a view showing an apparatus for transmitting 3DTV broadcasting according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification and the claims, unless explicitly described to the contrary, the word "comprise" and variations such as "comprises" or "comprising", will be understood to imply the inclusion of stated elements but not the exclusion of any other elements.

Next, an apparatus and a method for transmitting and receiving broadcasting according to an exemplary embodiment of the present invention will be described in detail with reference to the accompanying drawings.

Figure 2:
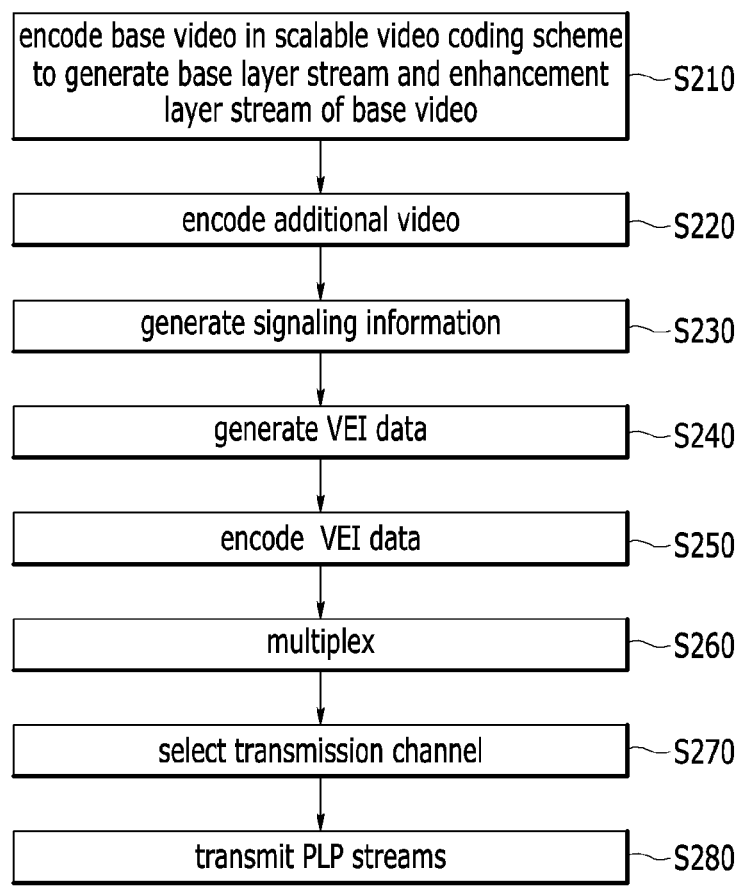
FIG. 2 is a flow chart showing a method for transmitting 3DTV broadcasting according to an exemplary embodiment of the present invention.

FIG. 1 is a view showing an apparatus for transmitting 3DTV broadcasting according to an exemplary embodiment of the present invention, and FIG. 2 is a flow chart showing a method for transmitting 3DTV broadcasting according to an exemplary embodiment of the present invention.

Contents transmitted by the apparatus 100 for transmitting 3DTV broadcasting shown in FIG. 1 may be videos, motion pictures, texts, or the like, and particularly, a three dimensional (3D) video among the videos may include a left video and a right video. One of the left video and the right video may be used as a base video, and the other thereof may be used as an additional video. The additional video may mean a video used in order to pair with a base video to configure one 3D video, and may have a resolution lower than that of the base video.

Referring to FIG. 1, the apparatus 100 for transmitting 3DTV broadcasting includes a base video scalable video encoder 110, an additional video encoder 120, a signaling information generator 130, a video enhancement information (VEI) generator 140, a VEI encoder 150, a multiplexer 160, a channel selector 170, and a transmitter 180.

Referring to FIG. 2, the base video scalable video encoder 110 encodes raw data of a base video in a scalable video coding (SVC) or scalable high efficiency video coding (SHVC) scheme to generate a base layer stream and an enhancement layer stream of the base video (S210), and outputs the base layer stream and the enhancement layer stream of the base video to the multiplexer 160. The base video scalable video encoder 110 may compress videos corresponding to a resolution lower than that of the base video into one bit stream to generate the base layer stream, and compress differential videos corresponding to different information between a video decodable from the base layer stream and an original video into another bit stream to generate the enhancement layer stream. That is, enhancement layer data are additional data for providing the base video having high video quality. For example, the base layer stream may support a high definition (HD) resolution, and the base layer stream and the enhancement layer stream may be combined with each other to support an ultra high definition (UHD) resolution.

The additional video encoder 120 encodes raw data of an additional video in a predefined encoding scheme (S220), and outputs the encoded data of the additional video to the multiplexer 160. The additional video encoder 120 may encode the raw data of the additional video a high efficiency video coding (HEVC) or H.264 scheme. The data of the additional video encoded by the additional video encoder 130 are output in a moving picture experts group transport stream (MPEG-TS) or Internet protocol (IP) stream form.

The signaling information generator 130 generates signaling information (S230), and outputs the signaling information in an MPEG-TS or IP steam form to the multiplexer 160. The signaling information may include a kind of 3DTV service, a video format of the additional video, information on whether the base video is a left video or a right video, error information between a reproduction time of the base video and a reproduction time of the additional video.

The VEI generator 140 generates VEI data for enhancing video quality of the additional video (S240). The VEI generator 140 may compare the additional video and the base video, and generate VEI information on the basis of a comparison result. Since a resolution of the additional video is lower than that of the base video, the resolution of the base video may be converted into the same resolution as that of the additional video in order to compare the data of the additional video with the base video. The VEI generator 140 may also compare the additional video and the base layer stream of the base video with each other. The VEI data may include mode information indicating data of which of the base video and the additional video have been used in order to enhance the video quality of the additional video. In order to extend the additional video having a low resolution to the same resolution as that of the base video and to enhance the video quality of the additional video, more excellent video information of the base video and the additional video is used as the VEI data. The VEI generator 140 may generate the VEI data using this principle. An apparatus for receiving 3DTV may enhance the video quality of the additional video so as to be close to video quality of the base video using the VEI data generated as described above.

The VEI encoder 150 encodes the VEI data (S250), and outputs the encoded VEI data in an MPEG-TS or IP stream form to the multiplexer 160. The VEI encoder 150 may encode the VEI data in a HEVC or H.264 scheme.

The multiplexer 160 multiplexes and outputs the base layer stream and the enhancement layer stream of the base video, the encoded additional video, the signaling information, and the VEI data (S260). In the case in which the base layer stream and the enhancement layer stream of the base video, the encoded additional video, the signaling information, and the VEI data have an MPEG-TS form, the multiplexer 160 may multiplex the base layer stream and the enhancement layer stream of the base video, the encoded additional video, the signaling information, and the VEI data, and output the multiplexed data in the MPEG-TS form. In the case in which the base layer stream and the enhancement layer stream of the base video, the encoded additional video, the signaling information, and the additional data have an IP stream form, the multiplexer 160 may multiplex the base layer stream and the enhancement layer stream of the base video, the encoded additional video, the signaling information, and the additional data, and output the multiplexed data in the IP stream form. Hereinafter, a description will be provided under assumption that an output of the multiplexer 160 is the MPEG-TS for convenience.

The channel selector may select transmission channels of an MPEG-TS corresponding to base layer data of the base video, an MPEG-TS corresponding to the enhancement layer data, an MPEG-TS corresponding to the signaling information, and an MPEG-TS corresponding to the additional video and the VEI data depending on a 3D service provided by a broadcasting station (S270).

The channel selector 170 may select the transmission channel of the MPEG-TS corresponding to the base layer stream of the base video and transmission channel of the MPEG-TS corresponding to the enhancement layer stream of the base video as a base layer channel and an enhancement layer channel, respectively, and select the base layer channel or the enhancement layer channel as the transmission channel of the MPEG-TS corresponding to the additional video and the VEI data. In the case in which the base layer channel is selected as the transmission channel of the MPEG-TS corresponding to the additional video and the VEI data, a mobile HD 3D service may be provided using the base layer stream of the base video and the additional video. In the case in which the enhancement layer channel is selected as the transmission channel of the MPEG-TS corresponding to the additional video and the VEI data, a fixed UHD 3D service may be provided using the base layer stream of the base video, the enhancement layer stream of the base video, and the additional video.

In addition, the channel selector 170 converts the MPEG-TS corresponding to the base video, the MPEG-TS corresponding to the signaling information, and the MPEG-TS corresponding to the additional video and the VEI data into physical layer pipe (PLP) streams, respectively, applies an unequal error protection (UEP) channel coding method to the respective PLP stream, and outputs the PLP streams to which the UEP channel coding method is applied to the transmitter 180. That is, the channel selector 170 may apply forward error correction (FEC) having different code rates to the respective PLP streams to correct an error.

The transmitter 180 modulates a plurality of PLP streams in a predefined modulation scheme, and transmits the modified PLP streams in a selected transmission channel (S280). As an example of the modulation scheme, an orthogonal frequency division multiplexing (OFDM) scheme may be used.

Figure 3:
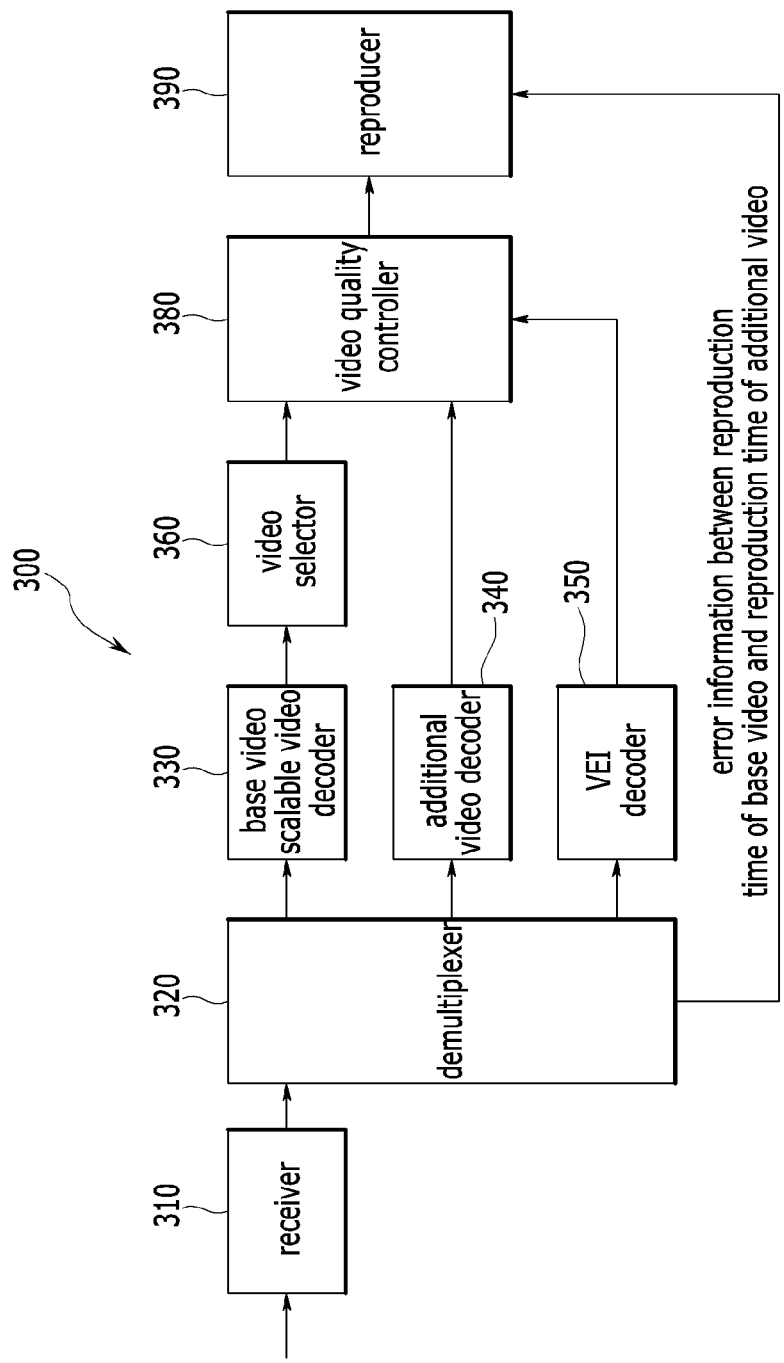
FIG. 3 is a view showing an apparatus for receiving 3DTV broadcasting according to an exemplary embodiment of the present invention.
Figure 4:
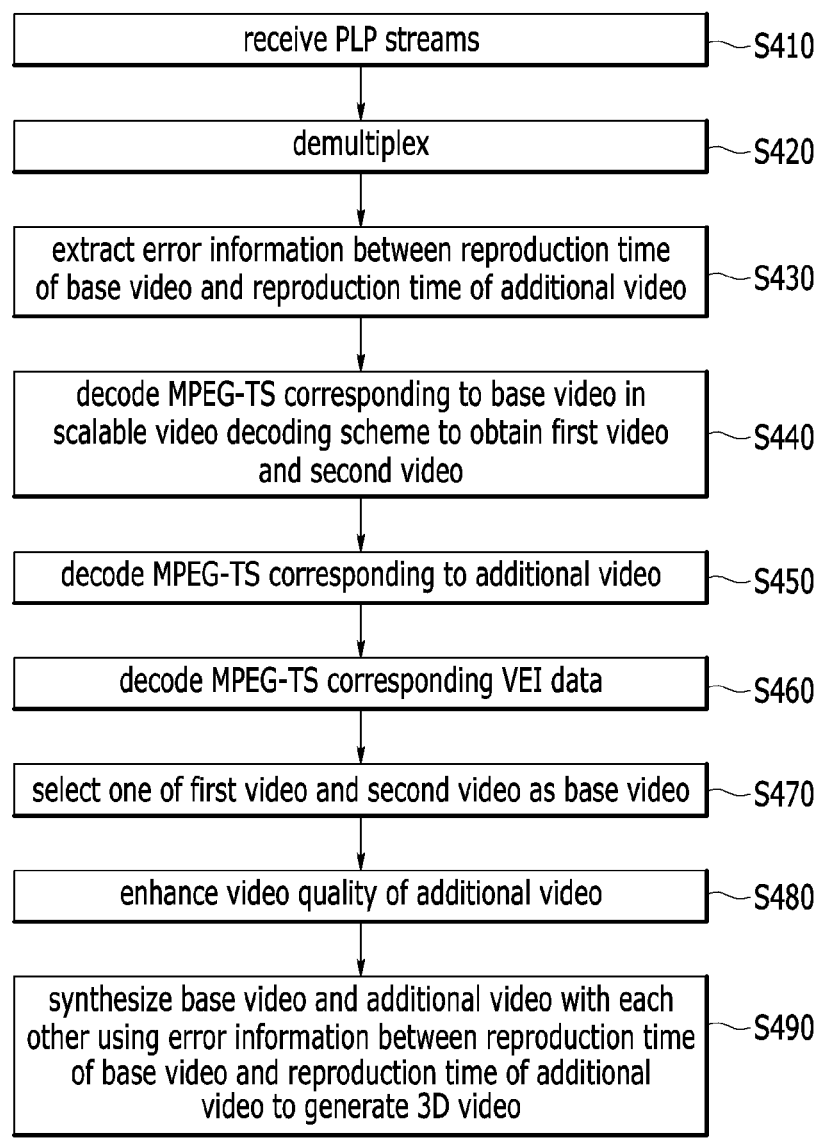
FIG. 4 is a flow chart showing a method for receiving 3DTV broadcasting according to an exemplary embodiment of the present invention.

FIG. 3 is a view showing an apparatus for receiving 3DTV broadcasting according to an exemplary embodiment of the present invention, and FIG. 4 is a flow chart showing a method for receiving 3DTV broadcasting according to an exemplary embodiment of the present invention.

Referring to FIG. 3, the apparatus 300 for receiving 3DTV broadcasting includes a receiver 310, a demultiplexer 320, a base video scalable video decoder 330, an additional video decoder 340, a VEI decoder 350, a video selector 360, a video quality controller 380, and a reproducer 390.

Referring to FIG. 4, the receiver 310 receives the plurality of PLP streams (410), and demodulates the plurality of PLP streams to extract the MPEG-TS that is multiplexed.

The demultiplexer 320 demultiplexes the MPEG-TS to separate the MPEG-TS into the MPEG-TSs corresponding to the base video, the signaling information, the additional video, and the VEI data (S420). The demultiplexer 320 transfers the MPEG-TS corresponding to the base video to the base video scalable video decoder 330, transfers the MPEG-TS corresponding to the additional video to the additional video decoder 340, and transfers the MPEG-TS corresponding to the VEI data to the VEI decoder 350. In addition, the demultiplexer 320 extracts the error information between the reproduction time of the base video and the reproduction time of the additional video from the MPEG-TS corresponding to the signaling information (S430), and transfers the error information to the reproducer 390.

The base video scalable video decoder 330 decodes the MPEG-TSs corresponding to the base layer stream and the enhancement layer stream of the base video in a scalable video decoding scheme to obtain a first video and a second video (S440), and transfers the first video and the second video to the video selector 360. The scalable video decoding scheme is decoding scheme corresponding to the scalable video coding (SVC) or scalable high efficiency video coding (SHVC) scheme of the apparatus 100.

The base video scalable video decoder 330 may decode only the MPEG-TS corresponding to the base layer stream of the base video to obtain the first video, and decode the MPEG-TSs corresponding to the base layer stream and the enhancement layer stream of the base video to obtain the second video. The base video scalable video decoder 330 extracts the reproduction time of the base video from the MPEG-TS corresponding to the base video, and outputs the extracted reproduction time to the reproducer 390.

The additional video decoder 340 decodes the additional video in a predefined decoding scheme (S450), and outputs the decoded additional video to the video quality controller 380. The additional video decoder 340 may decode the additional video in an HEVC or H.264 scheme. In addition, the additional video decoder 340 extracts the reproduction time of the additional video from the MPEG-TS corresponding to the additional video, and outputs the extracted reproduction time to the reproducer 390.

The VEI decoder 350 decodes the MPEG-TS corresponding to the VEI data in a predefined decoding scheme (S460), and outputs the decoded VEI data to the video quality controller 380. The VEI decoder 350 may decode the VEI data in an HEVC or H.264 scheme.

The video selector 360 selects one of the first video and the second video as the base video depending on the 3D service provided by the broadcasting station (S470), and outputs the selected video to the video quality controller 380. The video selector 360 may select the first video in the case of the mobile HD 3D service, and select the second video in the case of the fixed UHD 3D service.

Meanwhile, the base video scalable video decoder 330 may decode only the MPEG-TS corresponding to the base layer stream or decode the MPEG-TSs corresponding to the base layer stream and the enhancement layer stream depending on the 3D service provided by the broadcasting station. In this case, the video selector 360 transfers the first video or the second video output from the base video scalable video decoder 330 to the video quality controller 380.

The video quality controller 380 enhances the video quality of the additional video so as to be close to the video quality of the base video using the VEI data (S480). The video quality controller 380 may convert the resolution of the additional video into the same resolution as that of the base video in order to enhance the video quality of the additional video.

The reproducer 390 synthesizes the base video and the additional video of which the video quality is enhanced with each other to generate a 3D video, and the reproduces the 3D video using the reproduction time of the base video, the reproduction time of the additional video, and the error information between the reproduction time of the base video and the reproduction time of the additional video (S490).

Figure 5:
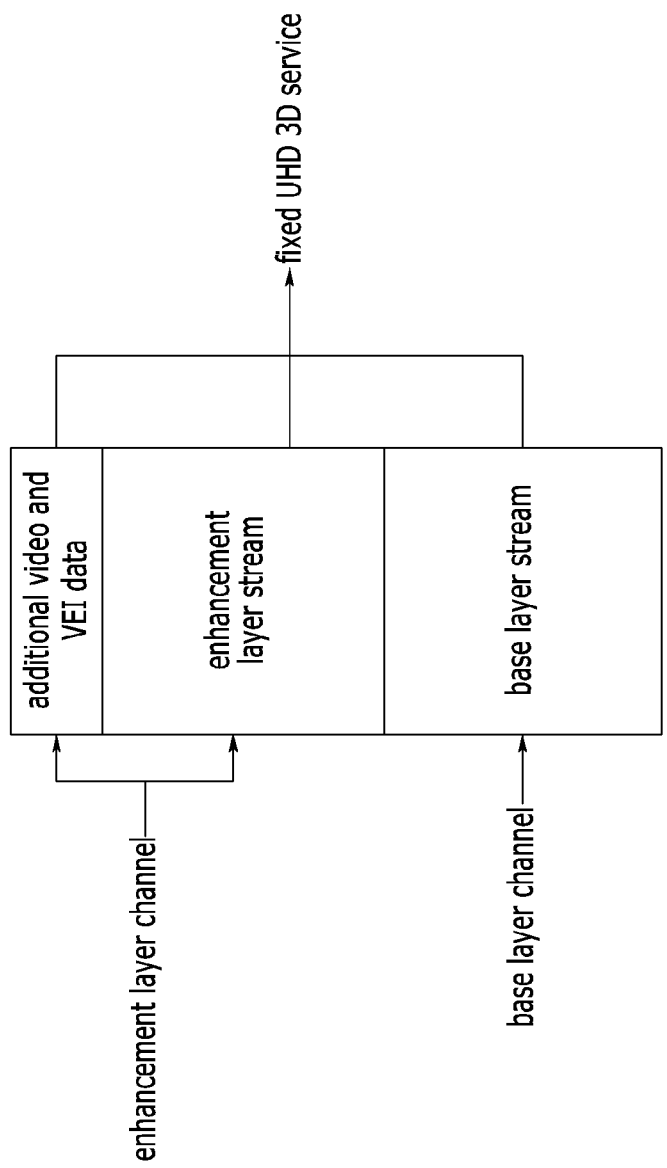
FIGS. 5 and 6 are views showing examples of 3DTV services according to an exemplary embodiment of the present invention.
Figure 6:
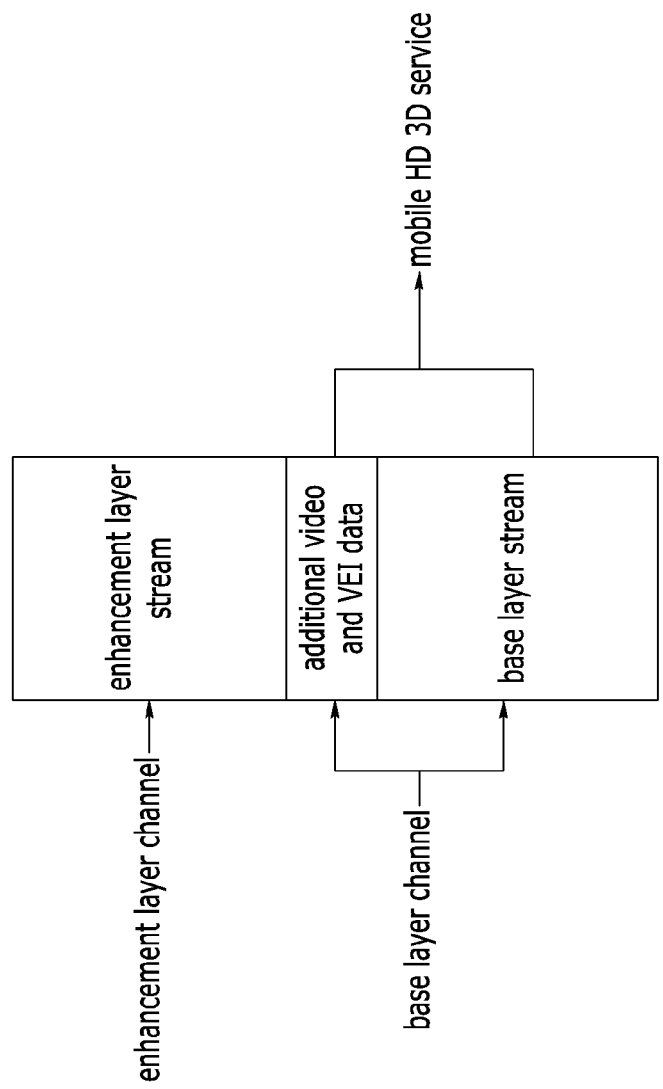

FIGS. 5 and 6 are views showing examples of 3DTV services according to an exemplary embodiment of the present invention.

Referring to FIG. 5, when the base layer stream and the enhancement layer stream of the base video are transmitted through the base layer channel and the enhancement layer channel, respectively, and the additional video and the VEI data are transmitted through the enhancement layer channel, by the apparatus 100 for transmitting 3DTV, the base video corresponding to the base layer stream and the additional video corresponding to the enhancement layer stream may be synthesized with each other by the apparatus 300 for receiving 3DTV broadcasting fixed broadcasting, such that the fixed UHD 3D service may be provided.

In addition, referring to FIG. 6, when the base layer stream and the enhancement layer stream of the base video are transmitted through the base layer channel and the enhancement layer channel, respectively, and the additional video and the VEI data are transmitted through the base layer channel, by the apparatus 100 for transmitting 3DTV, the base video corresponding to the base layer stream and the additional video may be synthesized with each other by the apparatus 300 for receiving 3DTV broadcasting mobile broadcasting, such that the mobile HD 3D service may be provided.

As described above, even in the case in which a scalable video codec is applied, since the additional video having a low resolution may be selectively transmitted together with the VEI data through the base layer channel or the enhancement layer channel, the fixed UHD 3D service and the mobile HD 3D service become possible.

According to exemplary embodiments of the present invention, even though the base video and the additional video encoded using independent video encoders are not simulcast through a fixed broadcasting channel and a mobile broadcasting channel, a mobile HD or fixed UHD 3DTV broadcasting service may be efficiency supported.

In addition, since the VEI information and the additional view for the 3D service may be transmitted through the base layer channel and the enhancement layer channel depending on selection of the broadcasting station, the mobile HD or fixed UHD 3D service may be selectively supported depending on a service model of the broadcasting station.

Exemplary embodiments of the present invention described above are not implemented through only the apparatus and/or the method described above, but may also be implemented through a program executing functions corresponding to configurations of exemplary embodiments of the present invention or a recording medium in which the program is recorded. In addition, this implementation may be easily made by those skilled in the art to which the present invention pertains from exemplary embodiments described above.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting 2DTV and 3DTV broadcasting by a transmission apparatus, the method comprising:
    encoding a base video using scalable video coding (SVC) or scalable high efficiency video coding (SHVC) scheme to generate a base layer stream and an enhancement layer stream, the enhancement layer stream including additional data for enhancing video quality of the base video;
    encoding an additional video that configures a three-dimensional (3D) video with the base video, wherein a resolution of the additional video is lower than that of the base video;
    encoding video enhancement information data for enhancing video quality of the additional video;
    transmitting the base layer stream of the base video through a base layer channel and transmitting the enhancement layer stream of the base video through an enhancement layer channel; and
    transmitting the encoded additional video and the encoded video enhancement information data through the base layer channel for a mobile HD (high definition) 3D service or transmitting the encoded additional video and the encoded video enhancement information data through the enhancement layer channel for a fixed UHD (ultra high definition) 3D service,
    wherein the encoding of the video enhancement information data includes generating the video enhancement information data on the basis of a comparison result between the base video and the additional video.

2. The method of claim 1, wherein:
    the encoding of the base video includes:
    compressing videos corresponding to a resolution lower than that of the base video to generate the base layer stream; and
    compressing differential videos corresponding to different information between a video decodable from the base layer stream and the base video to generate the enhancement layer stream.

3. A method for receiving 2D TV and 3D TV broadcasting by a reception apparatus, the method comprising:
    receiving a base layer stream and an enhancement layer stream through a base layer channel and an enhancement layer channel, respectively, the enhancement layer stream including additional data for enhancing video quality of a base video, the base layer stream and the enhancement layer stream being generated by encoding the base video using scalable video coding (SVC) or scalable high efficiency video coding (SHVC) scheme;
    receiving data of an additional video which configures a 3D video with the base video and video enhancement information data for enhancing video quality of the additional video through the base layer channel for a mobile HD (high definition) 3D service, wherein a resolution of the additional video is lower than that of the base video;
    enhancing the video quality of the additional video using the video enhancement information data; and
    reproducing a two-dimensional (2D) video having relatively low-quality using the base video from the base layer stream or reproducing a three-dimensional (3D) video using the base video and the additional video of which the video quality is improved,
    wherein the video enhancement information data is generated on the basis of a comparison result between the base video and the additional video.

4. The method of claim 3, wherein, when the video enhancement information data and the data of the additional video are received through the base layer channel, the reproducing of the 3D video includes obtaining the base video by decoding the base layer stream in the case of the mobile broadcasting.

5. The method of claim 3, wherein:
    the enhancing of the video quality of the additional video includes:
    converting a resolution of the additional video so as to be the same as that of the base video; and
    enhancing the video quality of the additional video using the video enhancement information data.

6. An apparatus for receiving 2DTV and 3DTV broadcasting, comprising:
    a base video scalable video decoder decoding a base layer stream and an enhancement layer stream received through a base layer channel and an enhancement layer channel, respectively, in scalable video decoding scheme, to obtain a base video;
    first and second decoders decoding video enhancement information data and data of an additional video that are received through the enhancement layer channel, wherein the video enhancement information data is used for enhancing video quality of the additional video, and wherein the additional video configures a 3D video with the based video and has a resolution lower than that of the base video;

a video enhancer enhancing the video quality of the additional video using the video enhancement information data; and a reproducer reproducing a 2D video having relatively high-quality using the base video from the base layer stream and the enhancement layer stream or reproducing a 3D video using the base video and the additional video of which the video quality is improved, wherein the video enhancement information data and the data of the additional video are transmitted through the enhancement layer channel for a fixed 3D service, and wherein the video enhancement information data is generated on the basis of a comparison result between the base video and the additional video.

7. The apparatus of claim 6, wherein:

the video enhancer converts the resolution of the additional video so as to be the same as that of the base video, and enhances the video quality of the additional video using the video enhancement information data.

* * * * *